April 12, 1927.  H. J. COCKS  1,624,860
FENDER BRACE
Filed Feb. 11, 1925
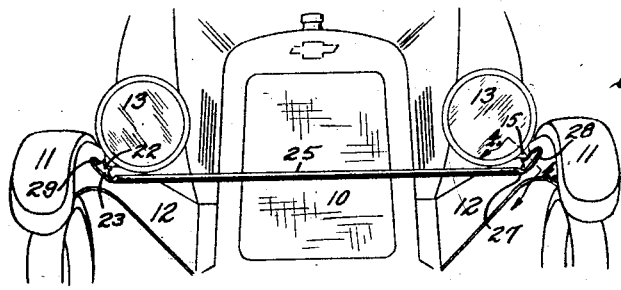
Fig.1.
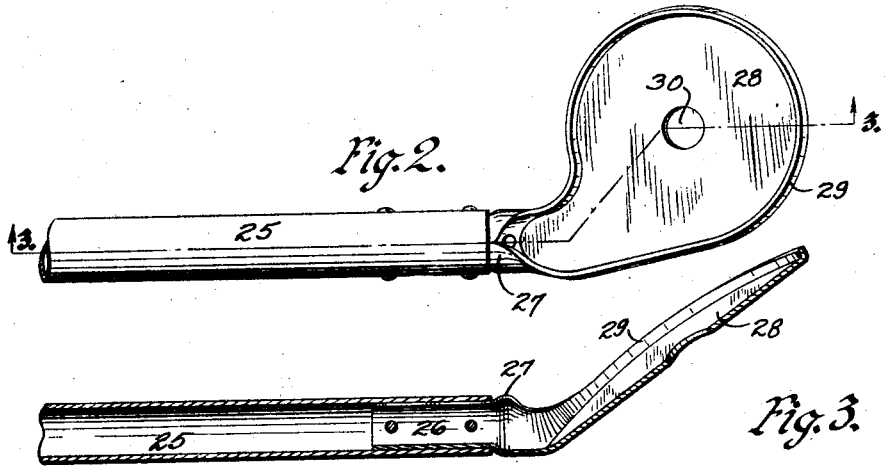
Fig.2.
Fig.3.
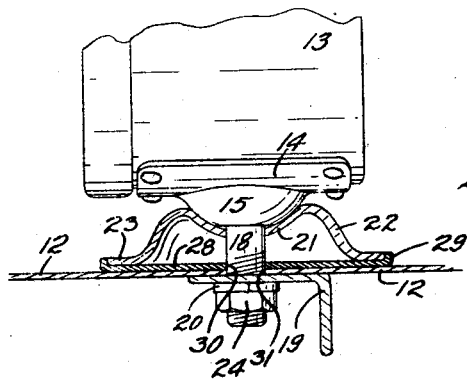
Fig.4.
Witness
Inventor
Harry J. Cocks
by Bair & Freeman Attorneys Patented Apr. 12, 1927.

1,624,860

UNITED STATES PATENT OFFICE.

HARRY J. COCKS, OF DES MOINES, IOWA.

FENDER BRACE.

Application filed February 11, 1925. Serial No. 8,412.

The object of my invention is to provide a fender brace of very simple, durable and inexpensive construction.

More particularly, it is my object to provide a brace adapted to be mounted between the front fenders of a standard Chevrolet automobile.

A further purpose of my invention is to provide such a brace adapted to cooperate with the usual parts of such a Chevrolet car for bracing the fenders, and properly supporting the brace for giving it a maximum efficiency.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 shows a front elevation of a car equipped with a brace embodying my invention.

Figure 2 shows a front elevation of one end of the brace.

Figure 3 is a detail, sectional view of a part of the brace taken on line 3—3 of Figure 2; and Figure 4 is a detail, sectional view taken on the line 4—4 of Figure 1.

In the accompanying drawings, I have used the reference numeral 10 to indicate generally that part shown of a Chevrolet automobile.

The automobile is provided with the front fenders 11 having apron members 12 extending from the fenders downwardly, and inwardly, to the body of the car.

The car has the lamps 13. At the lower part of each lamp, and at the outer part thereof is a bracket element 14 fixed to the lamp casing, and having a convex portion 15 from which projects a bolt or the like 18, which is normally extended through the apron 12, and the car frame member 19, and has on its outer end a washer 20.

Between the portion 15 and the fender apron 12 there is ordinarily provided in cars of this type, a shell comprising a concave portion 21 provided with a hole through which the bolt member 18 is extended and adapted to snugly fit the convex portion 15.

At the outer edge of the portion 21 is a curved flange 22 projecting toward the apron 12 and terminating in a flat rim 23.

Where my improved brace is used, the nuts 24 on the bolt member 18 are removed and the lamps are taken off before the installation of the brace.

The brace itself consists of a center brace member 25 preferably of tubular form having received in its ends and riveted thereto, a tubular member 26 with an annular rib 27 just outside the end of the brace member 25.

Formed on the tubular member 26 is a flat pan shaped element 28 which is inclined upwardly and rearwardly from the brace as shown in Figure 2 when the brace is in position for installation, and is adapted to set against the apron 12.

The pan shaped member 28 has a peripheral rim or flange 29, and has a central opening 30.

The pan shaped members 28 are placed against the aprons 12 with the holes 30 in registry with the holes 31 in the aprons.

The shell device 21 is then placed in position with the flat rim or annular portion 23 resting in the pan shaped member 28 adjacent to the flange 29 thereof, as shown in Figure 4.

The bolt member 18 is then inserted through the hole in the portion 28 and through the hole 30, and the holes in the aprons 12 and the frame members 19.

The washers 20 and the nuts 24 are installed in place for gripping the pan shaped members 28 of the brace between the annular portions 23, and the aprons 12.

It will thus be seen that I have provided a very strong fender brace which may be installed on the car without the requirement of any bolts, nuts, clamps or any fastening devices other than those usually found on the car.

The fastening elements at the ends of the brace are peculiarly adapted for their purpose.

The pan shaped members 28 extend rearwardly from the brace permitting the brace to stand, when installed, in front of the radiator 32. They offer a flat surface bearing against a considerable area of the fender apron. They are engaged between the lamp structure and a fender apron in such manner as to be held much more rigidly, and with less likelihood of wear than would be the case if the brace were provided with brackets at its ends, with bolts extended through the brackets in the ordinary way.

By utilizing the lamp supporting structure, the brace is held against any twisting movement on the bolt members 18.

The tubular members 26 are provided in their lower parts adjacent to the ends of the brace member 25 with suitable drainage openings 32. These are of some importance for the reason that without them it might be possible for water to collect in the tubular members 26 and freeze and thus injure the brace.

I claim as my invention:

In combination with the fender aprons of an automobile having headlights provided with bases supported thereon by bolt connections extending from said bases and through said aprons, a fender brace for said fenders comprising pan shaped elements adapted to fit between the headlights and the fender aprons and have the bolts of said bolt connections extending therethrough, the upturned edges of said pan shaped members fitting around the bases of said headlights and a bar connecting said elements together.

HARRY J. COCKS.